United States Patent [19]
Larsen

[11] Patent Number: 5,841,267
[45] Date of Patent: Nov. 24, 1998

[54] POWER FLOW CONTROL WITH ROTARY TRANSFORMERS

[75] Inventor: Einar Vaughn Larsen, Charlton, N.Y.

[73] Assignee: General Electric Co., Schenectady, N.Y.

[21] Appl. No.: 814,374

[22] Filed: Mar. 11, 1997

Related U.S. Application Data

[63] Continuation-in-part of Ser. No. 550,941, Oct. 31, 1995, abandoned, which is a continuation-in-part of Ser. No. 426,201, Apr. 21, 1995, abandoned.

[51] Int. Cl.$^6$ .................................................. G05F 5/04
[52] U.S. Cl. ................................ 323/215; 323/207
[58] Field of Search .......................... 323/205, 207–210, 323/215–218, 255, 257, 340, 342; 307/102, 105; 363/170

[56] References Cited

U.S. PATENT DOCUMENTS

| | | |
|---|---|---|
| 3,471,708 | 10/1969 | Rauhut et al. . |
| 3,694,728 | 9/1972 | Kanngiesser et al. . |
| 3,701,938 | 10/1972 | Chadwick . |
| 3,836,837 | 9/1974 | Rauhut . |
| 4,019,115 | 4/1977 | Lips . |
| 4,179,729 | 12/1979 | Stanton et al. ........................... 363/175 |
| 4,238,822 | 12/1980 | Schade . |
| 4,249,237 | 2/1981 | Ronk et al. . |
| 4,251,736 | 2/1981 | Coleman . |
| 4,445,049 | 4/1984 | Steigerwald . |
| 4,489,261 | 12/1984 | Hartwig et al. .......................... 318/700 |

(List continued on next page.)

FOREIGN PATENT DOCUMENTS

| | | |
|---|---|---|
| 2 170 686 A | 10/1996 | Canada . |
| 1 488 773 | 4/1969 | Germany . |
| 34 43 428 A1 | 6/1985 | Germany . |
| 1 157 885 | 7/1969 | United Kingdom . |
| 2 055 515 | 3/1981 | United Kingdom . |

OTHER PUBLICATIONS

Enrique Lopez P., et al "Control and Planning of 50/60 Hz Industrial System Load Flows", Aug. 1990, Proceedings of the Colloquium in S. America, Argentina, Brazil, Chile, Uruguay, pp. 162–167.

General Electric Publication 6070, "Inductrol® Voltage Regulators", pp. 30 and 31, Jun. 10, 1974.

Goto et al, "Power System Stabilizing Control By Adjustable Speed Pumped Storage Power Station Using Stabilizing Signals", CIGRE Symposium Tokyo, pp. 1–6, 1995.

(List continued on next page.)

*Primary Examiner*—Adolf Berhane
*Attorney, Agent, or Firm*—Nixon & Vanderhye

[57] ABSTRACT

A power flow controller seeks to inject a voltage $V_{ser}$ on a transmission path between a first electrical area and a second electrical area, in order to cause a desired power flow into the second electrical area. The power flow controller (20) includes a series transformer (40), a regulating transformer (44), a rotary phase shifting transformer network (44), and a control system (46). The rotary phase shifting transformer network (44) includes a first rotary phase shifting transformer (102$_1$) and a second rotary phase shifting transformer (102$_2$). The first rotary phase shifting transformer and the second rotary phase shifting transformer have first terminals (windings of one of either rotors or stators) connected in parallel to a regulating winding 62) of the regulation transformer. Second terminals (windings of the other of rotors or stators) are connected in series with an excited winding (52) of the series transformer. The control system applies control signals to the first rotary phase shifting transformer and the second rotary phase shifting transformer to obtain desired phase angles $\theta_{E1}$, $\theta_{E2}$ between the rotor (110) and stator (112) of each transformer, and thereby achieve an effective phase shift $\theta_{PFC}$ and a voltage magnitude ratio $T_{PFC}$ between the first electrical area and the second electrical area.

18 Claims, 6 Drawing Sheets

U.S. PATENT DOCUMENTS

| | | | |
|---|---|---|---|
| 4,503,377 | 3/1985 | Kitabayashi et al. | 318/807 |
| 4,517,471 | 5/1985 | Sachs | 307/67 |
| 4,625,125 | 11/1986 | Kuwabara . | |
| 4,694,189 | 9/1987 | Haraguchi et al. . | |
| 4,753,827 | 6/1988 | Shiozaki et al. | 318/798 |
| 4,754,156 | 6/1988 | Shiozaki et al. . | |
| 4,794,544 | 12/1988 | Albright et al. . | |
| 4,804,900 | 2/1989 | Soeda | 318/719 |
| 4,816,696 | 3/1989 | Sakayori et al. . | |
| 4,823,018 | 4/1989 | Kuwabara et al. . | |
| 4,870,558 | 9/1989 | Luce . | |
| 4,920,277 | 4/1990 | Kuwabara et al. . | |
| 4,922,124 | 5/1990 | Seki et al. . | |
| 4,941,079 | 7/1990 | Ooi . | |
| 4,992,721 | 2/1991 | Latos . | |
| 4,994,684 | 2/1991 | Lauw et al. . | |
| 5,111,377 | 5/1992 | Higasa et al. | 363/95 |
| 5,166,597 | 11/1992 | Larsen et al. | 323/215 |
| 5,239,251 | 8/1993 | Lauw . | |
| 5,341,280 | 8/1994 | Divan et al. . | |
| 5,343,139 | 8/1994 | Gyugi et al. | 323/207 |
| 5,469,044 | 11/1995 | Gyugyi et al. | 323/207 |
| 5,550,457 | 8/1996 | Kusase et al. . | |
| 5,608,615 | 3/1997 | Luce . | |

OTHER PUBLICATIONS

Puchstein, Lloyd, and Conrad, *Alternating–Current Machines*, 3rd Edition, John Wiley & Sons, Inc., New York, pp. 425–428, particularly FIG. 275 on p. 428, ©1926, 1942.

Kron, *Equivalent Circuits of Electric Machinery*, John Wiley & Sons, Inc., New York, pp. 150–163, particularly FIG. 9.5a on p. 156, 1951.

Larsen et al, "Specification of AC Filters for HVDC Systems", 1989, pp. 1–7.

"Rotary Converters", Westinghouse Electric & Manufacturing Company, Circular No. 1028, Apr. 1903, pp. 1–15.

"Inductoral Voltage Regulators", General Electric Company, Publication 6070, pp. 29–30, Jun. 10, 1974.

"Magnetic Circuits and Transformers", John Wiley & Sons, Inc., New York, 1943, pp. 497–515.

POWER FLOW CONTROL WITH ROTARY TRANSFORMERS

This application is a continuation-in-part of U.S. patent application Ser. No. 08/550,941 filed Oct. 31, 1995 by Runkle et al. now abandoned and entitled "INTERCONNECTION SYSTEM FOR ELECTRICAL SYSTEMS HAVING DIFFERING ELECTRICAL CHARACTERISTIC", which in turn is a continuation-in-part of U.S. patent application Ser. No. 08/426,201 filed Apr. 21, 1995 by Runkle now abandoned and entitled "INTERCONNECTION SYSTEM FOR ELECTRICAL SYSTEMS HAVING DIFFERING ELECTRICAL CHARACTERISTIC", both of which are incorporated herein by reference.

TECHNICAL FIELD

This invention pertains to the transmission of power between electrical systems or electrical areas, and particularly to power flow apparatus and method for controlling the transmission of power.

BACKGROUND

It is often necessary or desirous to transmit power between two electrical areas, e.g., between two utility companies or electrical systems. In so doing, it is common to inject a voltage in series with a transmission path between the two electrical areas. A conventional phase shifting transformer (PST) has been utilized to inject a voltage, with the voltages in the two electrical areas being shifted in phase but having the same amplitude.

A conventional phase shifting transformer typically comprises a series transformer connected between the two electrical areas, a regulating transformer (having an exciting winding coil connected to a series winding of the series transformer), and a switching network (connected to a regulating winding of the regulating transformer and to an excited winding of the series transformer). In one prior art implementation, the switching network comprises tap changers which have a number of discrete values.

U.S. Pat. No. 5,166,597 to Larsen et al. (incorporated herein by reference) shows various techniques for improving conventional phase shifting transformers. In one technique, the switching network is augmented with thyristor valves to overcome problems with mechanical switches. In another technique, reactive components are included to provide some additional control over the injected voltage. In each of these techniques, the series injected voltage remains in quadrature with the regulating voltage such that the effective turns ratio $V_2/V_1$, equals 1.00.

U.S. Pat. No. 5,343,139 to Gyugyi et al. discloses a universal power flow controller which utilizes large power-electronic converters to inject a series voltage of arbitrary magnitude and angle with respect to the regulating voltage. The net result is an effective phase shift and magnitude ratio between the two sides of the device which can be set at any value within a circle shown as FIG. 2 of that patent. Unfortunately, controllers with large power-electronic converters are complex, have large physical size, and present issues of harmonics.

What is needed therefore, and an object of the present invention, is a simplified and effective technique for regulating power flow on a transmission path between two electrical areas, and which provides a desired voltage magnitude ratio as well as a desired phase shift as well.

DISCLOSURE OF THE INVENTION

A power flow controller seeks to inject a voltage $V_{ser}$ on a transmission path between a first electrical area and a second electrical area, in order to cause a desired power flow into the second electrical area. The power flow controller includes a series transformer, a regulating transformer, a rotary phase shifting transformer network, and a control system. The rotary phase shifting transformer network includes a first rotary phase shifting transformer and a second rotary phase shifting transformer. The first rotary phase shifting transformer and the second rotary phase shifting transformer have first terminals (one of either rotors or stator windings) connected in parallel to a regulating winding of the regulation transformer. Second terminals (the other of either the rotor or stator windings) are connected in series with an excited winding of the series transformer. The control system applies control signals to the first rotary phase shifting transformer and the second rotary phase shifting transformer to obtain desired phase angles $\theta_{E1}$, $\theta_{E2}$ between the rotor and stator of each transformer, and thereby achieve an effective phase shift $\theta_{PFC}$ and a voltage magnitude ratio $T_{PFC}$ between the first electrical area and the second electrical area.

BEST MODE FOR CARRYING OUT THE INVENTION

Figure 1:
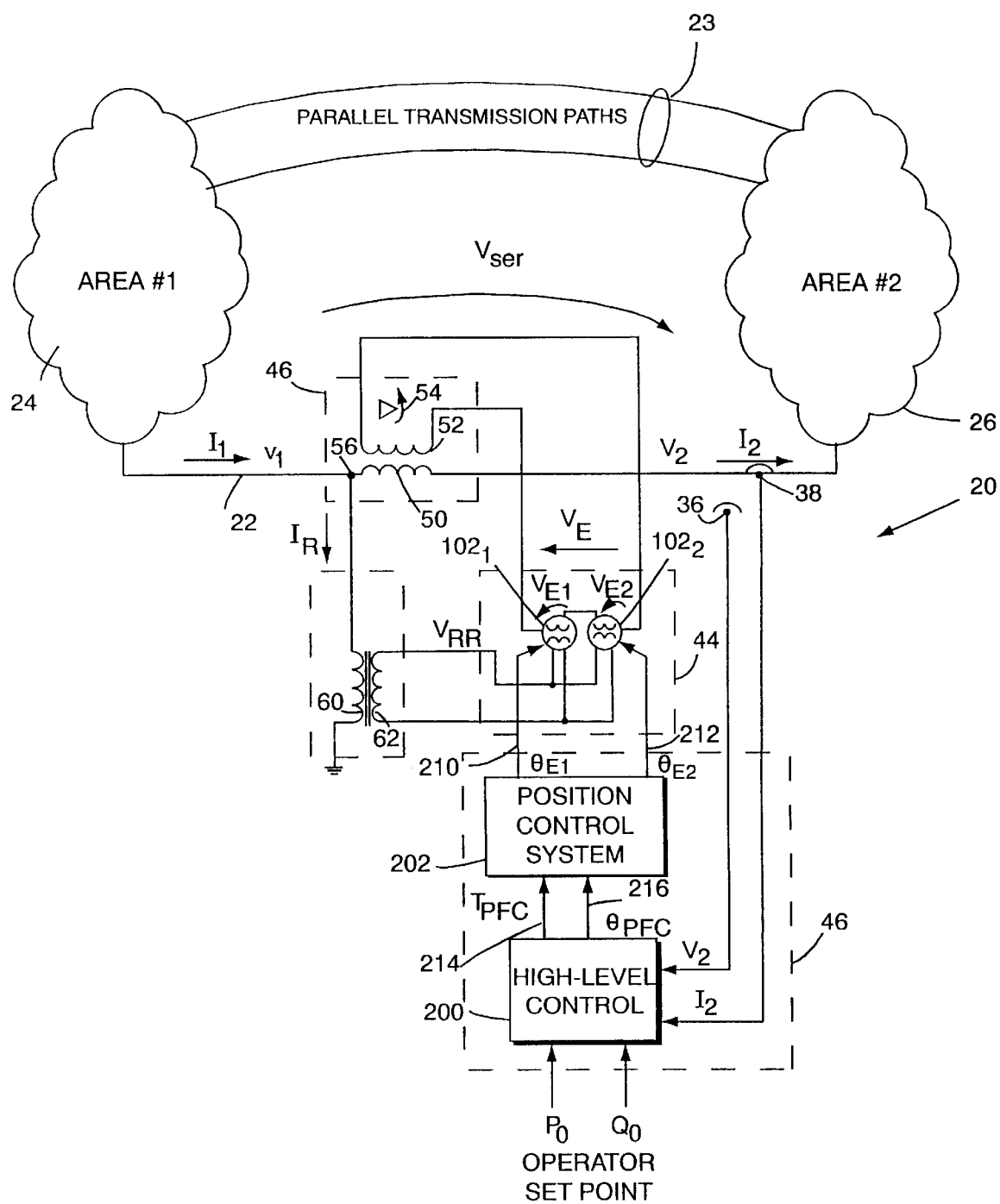
FIG. 1 is a schematic view of a power flow controller according to an embodiment of the invention.

FIG. 1 shows a power flow controller 20 on a transmission path or line 22 between a first electrical area or network 24 and a second electrical area or network 26. Transmission path 22 can be just one of a plurality of transmission paths connecting areas 24 and 26, other (parallel) transmission paths 23 being also shown in FIG. 1.

Network 24 has a voltage $V_1$; network 26 has a voltage $V_2$. As described hereinafter, power flow controller 20 allows an operator to select both the real and reactive power flow into network 26 by injecting a voltage $V_{ser}$ in series on transmission path 22.

Transmission line 22 is a three-phase line. Voltage transducer 36 senses the voltage $V_2$ in network 26. Current transducer 38 measures current $I_2$ flowing to network 26. A current $I_1$ flows from network 24 to power flow controller 20.

As shown in FIG. 1, power flow controller 20 comprises a series transformer 40; a regulating transformer 42; a rotary phase shifting transformer network 44; and, a control system 46, each of which are described in more detail below.

Series transformer 40 includes a series winding 50 in series with transmission line 22 and an excited winding 52. Excited winding 52 is connected in a rotated delta configuration, as indicated by the triangle with curved arrow 54 appearing proximate winding 52. A connection 56 is illustrated as being situated on an input side of series winding 50, although connection 56 could be on either side or center connected to series winding 50. Alternatively, connection 56 could be to some point in first electrical area 24 or in second electrical area 26. In any of these configurations, connection 56 is said to occur on a first side of transmission path 22 and has the voltage $V_1$, and thus the first said is said to be connected to the first electrical area.

Regulating transformer 42 includes an exciting winding 60 and a regulating winding 62. Exciting winding 60 is connected between connection 56 of series transformer 40 and ground and carries a current $I_R$. Regulating winding 62 is connected to rotary phase shifting transformer network 44 in the manner discussed below.

Rotary phase shifting transformer network 44 comprises first rotary phase shifting transformer $102_1$ and second rotary phase shifting transformer $102_2$. As will be elaborated hereinafter, first terminals of each of first rotary phase shifting transformer $102_1$ and second rotary phase shifting transformer $102_2$ are connected in parallel to regulating winding 62 of regulating transformer 42. Second terminals of each of first rotary phase shifting transformer $102_1$ and second rotary phase shifting transformer $102_2$ are connected in series with excited winding 52 of series transformer 40.

Prior to explaining in more detail the connections of rotary phase shifting transformer network 44, a discussion of a rotary phase shifting transformer is first provided. An exemplary one of the rotary phase shifting transformers, referenced generically in unsubscripted manner simply as transformer 102 for convenience, is shown in FIG. 2 for describing details of each of transformers $102_1$ and $102_2$.

Figure 2:
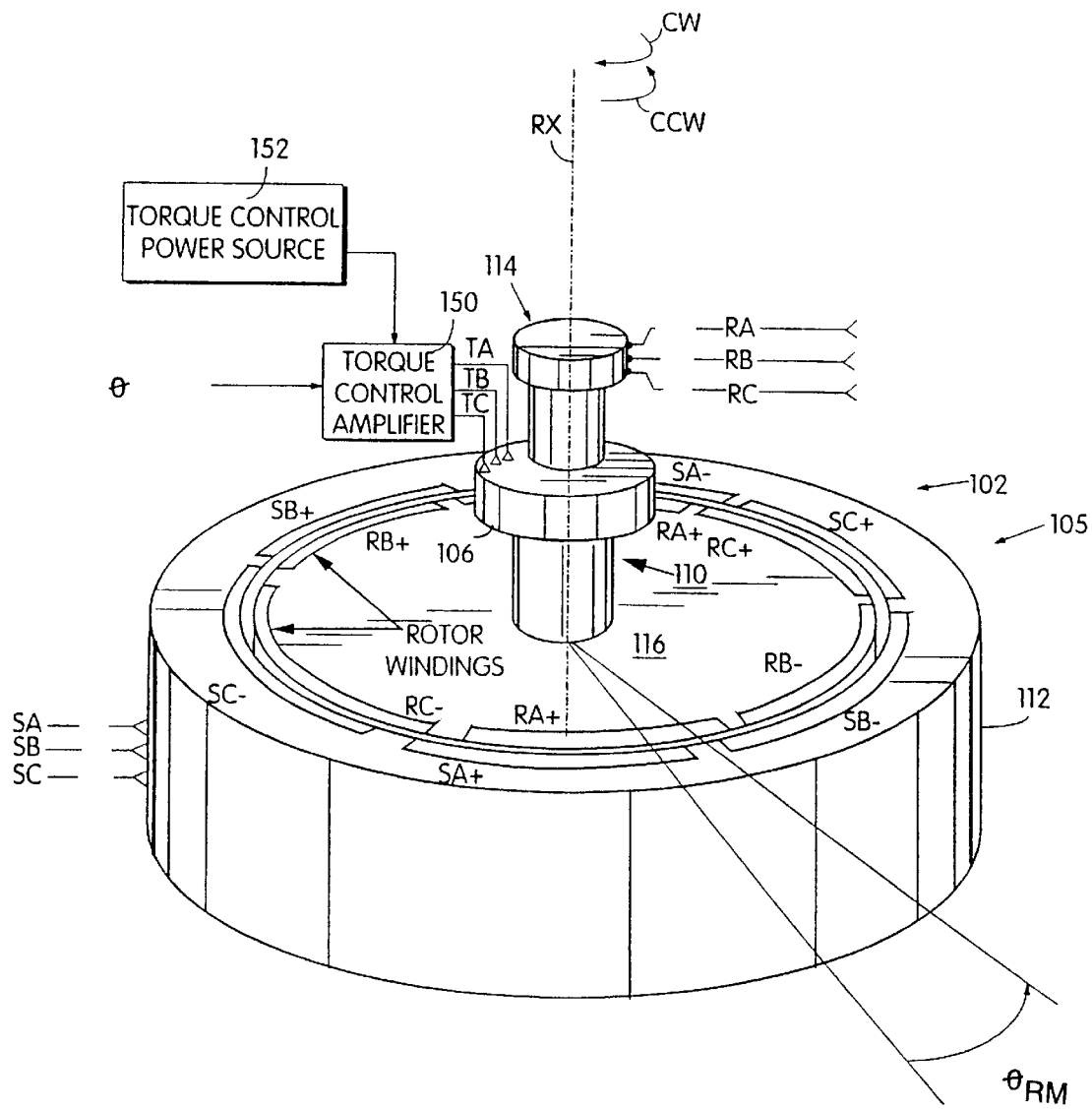
FIG. 2 is a partial schematic, partial perspective view of a rotary phase shifting transformer included in the power flow controller of the invention.

FIG. 2 shows that rotary phase shifting transformer 102 includes both a rotary transformer assembly 105 and a torque control unit 106 (also known as the rotor drive section). Rotary transformer assembly 105 includes both a rotor subassembly 110 and a stator 112. Rotor subassembly 110 includes collector rings 114 (also known as slip rings) and rotor cage section 116. Three-phase lines RA, RB, RC are connected to collector rings 114; three-phase lines SA, SB, and SC are connected to stator 112 (the A, B, and C representing corresponding one of the three phase lines; the "R" referring to rotor and the "S" referring to stator). Rotary phase shifting transformer 102 has a torque control amplifier 150. Power is supplied to torque control amplifier 150 by torque control power source 152.

In the illustrated embodiment rotary transformer assembly 105 is wound with sixty degree phase belts, with rotor windings being labeled as RA+, RC−, RB+, RA−, RC+, and RB− and stator windings labeled as SA+, SC−, SB+, SA−, SC+, and SB−. It should be understood that the invention is not limited to a sixty degree phase belt-wound system, rather the principles of the invention are applicable for rotary transformer assemblies of pole number two and greater.

Rotor assembly 110 is rotatable about its axis RX in both clockwise direction CW and counter-clockwise direction CCW. Rotation of rotor assembly 110 is effected by rotor drive section 106. Rotor drive section 106 is shown symbolically in FIG. 2 as a cylindrical section mounted on rotor assembly 110. Thus, rotor drive section 106 of FIG. 2 generally depicts various alternative and different types of drive mechanisms for causing rotation of rotor assembly 110.

Figure 3:
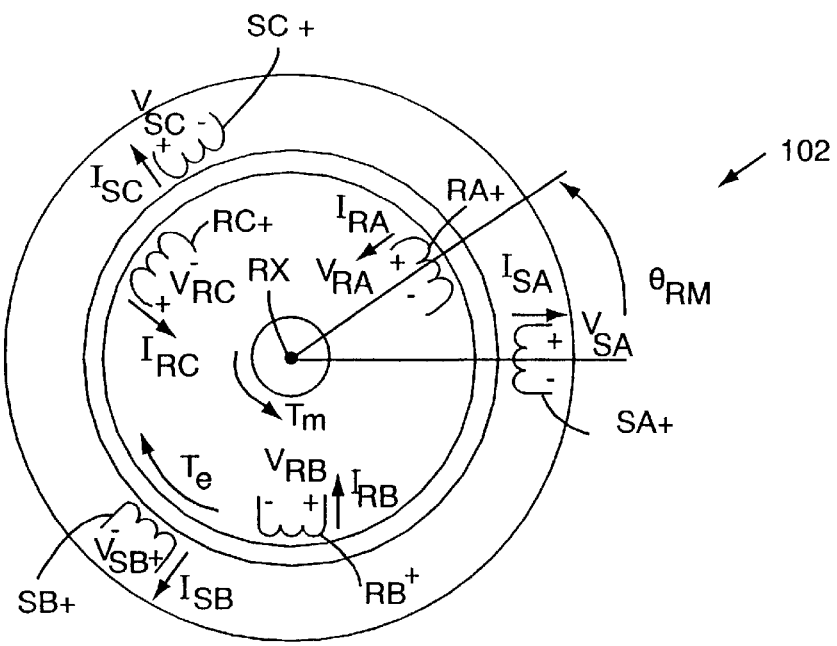
FIG. 3 is a schematic view of the rotary phase shifting transformer of FIG. 2.
Figure 4:
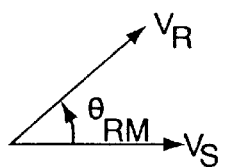
FIG. 4 is a phasor diagram showing rotor voltage $V_R$ and stator voltage $V_s$ and the angular position $\theta_{RM}$ of a rotor relative to a stator for a single rotary phase shifting transformer.

FIG. 3 provides an electrical schematic of rotary phase shifting transformer 102, showing for simplification only one set (positive) of windings for each phase and showing current flow and voltage across each illustrated winding. For example, current $I_{RA}$ flows in winding RA+; current $I_{SA}$ flows in winding SA+. Voltage $V_{RA}$ is across winding RA+; voltage $V_{SA}$ is across winding SA+. Rotor subassembly 110 has a torque $T_M$ about axis RX. At the time shown in FIG. 2 and FIG. 3, rotor 110 and stator 112 are offset by a phase angle $\theta_{RM}$ related to the angular position of rotor 110. The magnitude of the rotor voltage $V_R$ and stator voltage $V_S$ is fixed and independent of the angular position of rotor 110. FIG. 4 is a phasor diagram showing rotor voltage $V_R$ and stator voltage $V_S$ and the angular position $\theta_{RM}$ of rotor 110 relative to stator 112 for a single rotary phase shifting transformer 102.

Returning to FIG. 1, and particularly to connections of rotary phase shifting transformer network 44 to transformers 40 and 42, it should be understood that by nature of line 22 being a three phase line, each of transformer windings (including excited winding 52 and regulating winding 62) are connected to three phase lines. Further, these three phase lines are connected to appropriate and corresponding ones of the A, B, or C windings of either rotor 110 or stator 112, as the case may be.

Figure 5:
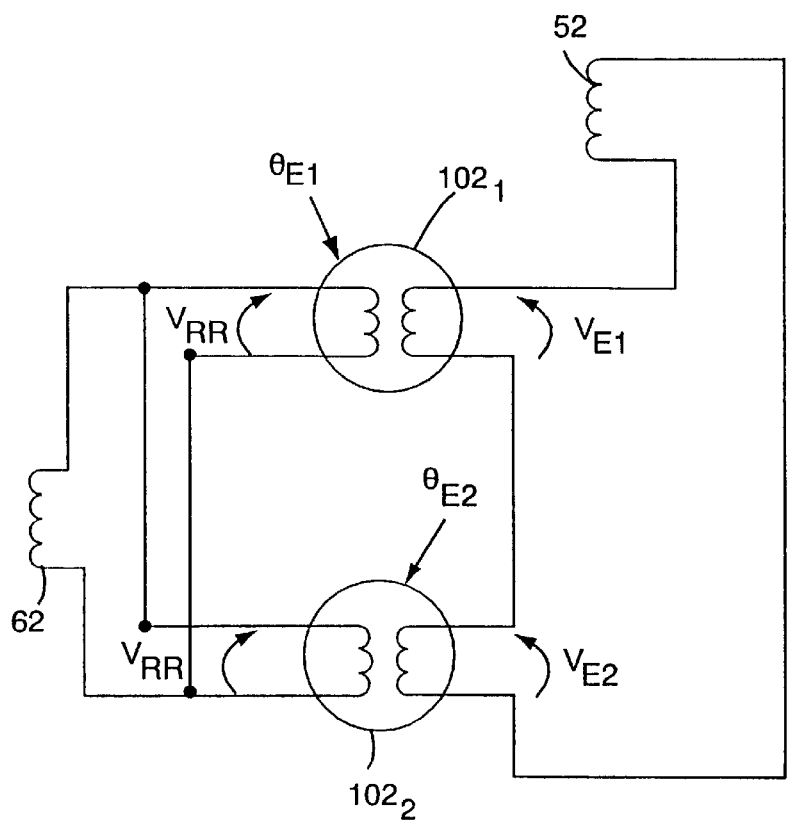
FIG. 5 is a schematic view of a rotary phase shifting network, showing particularly a connection of a pair of rotary phase shifting transformers included therein.

In the above regard, it has been mentioned above that first terminals of each of first rotary phase shifting transformer $102_1$ and second rotary phase shifting transformer $102_2$ are connected in parallel to regulating winding 62 of regulating transformer 42. For example, in one embodiment shown in FIG. 5, the first terminals of transformers $102_1$ and $102_2$ are the stators (i.e., the windings of stator 112) of each of the transformers. That is, the three phase line connected to regulating winding 62 is connected so that the phase A line is connected to the stator windings A of both transformers $102_1$ and $102_2$, so that the phase B line is connected to the stator windings B of both transformers $102_1$ and $102_2$, and so forth. In FIG. 5, only one line of the three phase line is shown, and only one winding is depicted about the stator and rotor, although it should be understood that six windings occur for each of the stator and rotor.

Second terminals of transformers $102_1$ and $102_2$, on the other hand, are connected in series with excited winding 52 of series transformer 40. For the FIG. 5 embodiment, the second terminals are the rotors of transformers $102_1$ and $102_2$. Therefore, the three phase line connected to excited winding 52 has its three lines connected to respective ones of the rotor windings of transformer $102_2$, with the rotor windings of transformer $102_2$ being in turn connected to respective ones of the rotor windings of transformer $102_1$, with the rotor windings of transformer $102_1$ being connected by the respective three lines back to excited winding 52 of series transformer 40.

While FIG. 5 shows the stator windings as being the first terminals of transformers $102_1$ and $102_2$ and the rotor windings as being the second terminals, it should be appreciated that such terminal assignment can be reversed. That is, in an alternate embodiment, the rotor windings can be connected in parallel to regulating winding 62 of regulating transformer 42 and the stator windings can be connected in series with excited winding 52 of series transformer 40.

As shown in FIG. 1, control system 46 includes both a high-level controller 200 and a position controller 202. High-level controller 200 is connected to voltage transducer 36 (to receive the value of $V_2$) and to current transducer 38 (to receive the value of current $I_2$). Further, high-level controller 200 receives two operator set point input signals, specifically a real power order signal $P_O$ and a reactive power order signal $Q_O$ indicative of the real and reactive power requirements of second electrical area 26. Setting order (input) signals $P_O$ and $Q_O$ can be accomplished by adjusting a knob or inputting data at an operator control panel or operator workstation, which may be proximate or remote to controller 200.

An objective of control system 46 is to regulate real and reactive power flow into area 26. Using the real power order signal $P_O$ and the reactive power order signal $Q_O$, as well as the transduced values of $V_2$ and $I_2$, high-level controller 200 generates the signals $T_{PFC}$ and $\theta_{PFC}$ which are applied on lines 214 and 216, respectively, to position controller 202.

Signals $T_{PFC}$ and $\theta_{PFC}$ are the desired effective voltage magnitude ratio and phase shift $\theta_{PFC}$ between first electrical area 24 and second electrical area 26, generated by the power flow controller 20. It is well known in the art that operating on these two components will permit effective regulation of real and reactive power flow, respectively.

Figure 8:
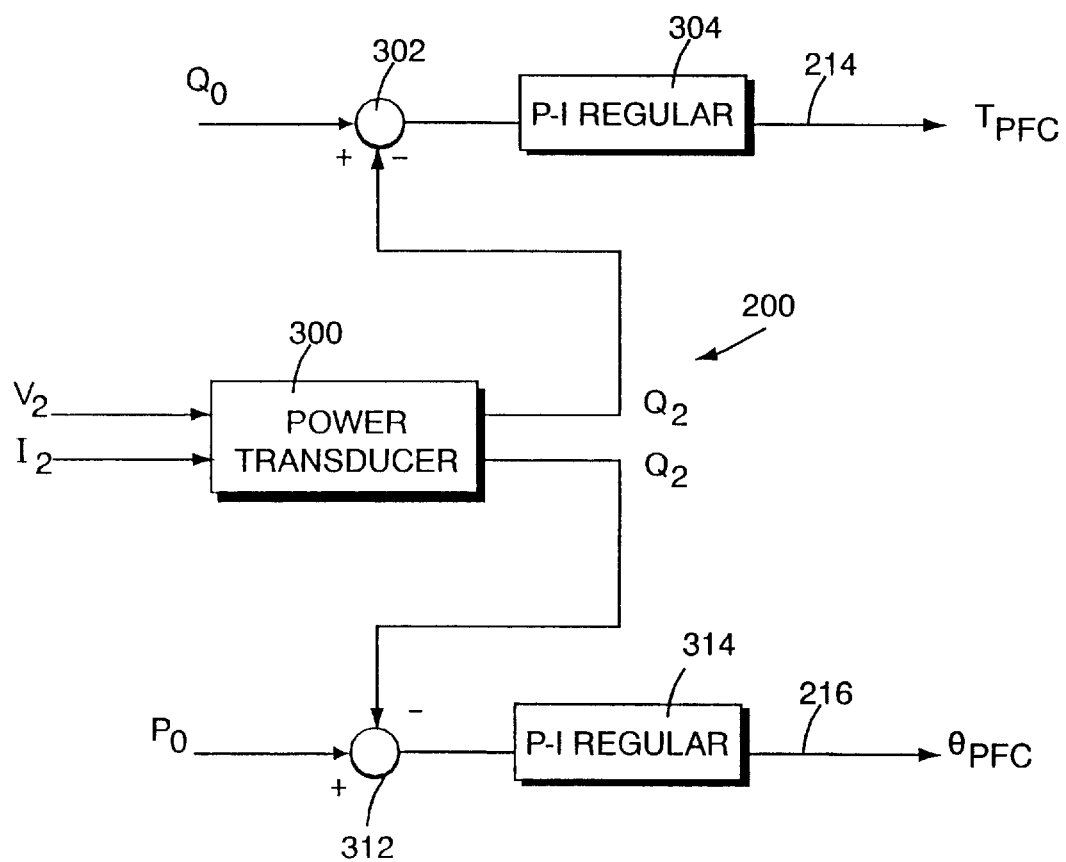
FIG. 8 is a schematic view of an embodiment of a high-level controller for the power flow controller of the invention.

One embodiment of high-level controller 200 is shown in FIG. 8. The controller 200 of FIG. 8 receives the inputs $V_2$ and $I_2$ at power transducer 300, and generates signals $Q_2$ and $P_2$. Signal $Q_2$ is applied to a negative terminal of error-summing element 302; the operator input signal $Q_O$ is applied to a positive terminal of error-summing element 302. Error-summing element 302 outputs a value indicative of the sum of $Q_O$–$Q_2$ to proportional-plus-integral (P-I) regulator 304, which in turn outputs the signal $T_{PFC}$ on line 214 in the manner aforedescribed. Similarly, signal $P_2$ is applied to a negative terminal of error-summing element 312; the operator input signal $Q_O$ is applied to a positive terminal of error-summing element 312. Error-summing element 312 outputs a value indicative of the sum of $P_O$–$P_2$ to P-I regulator 314, which in turn outputs the signal $\theta_{PFC}$ on line 216 in the manner aforedescribed.

In the controller 200 of FIG. 8, real and reactive power flow is transduced via well-known prior art element 300 based on a measure of voltage and current on one side of the rotary phase frequency transformer network 44 (e.g, in network 26). These measured flow signals are compared to the setpoints, e.g., the order signals $Q_O$, $P_O$, established by the system operator in error-summing elements. The errors are then amplified by conventional regulator function, such as a proportional-integral type regulators 304, 314, which adjusts the commands for phase shift ($\theta_{PFC}$) and magnitude ratio ($T_{PFC}$) of the rotary phase frequency transformers 102.

Using signals $T_{PFC}$ and $\theta_{PFC}$, position controller 202 computes the corresponding ratio of $V_E/V_1$ and the relative angle $\theta_E$ between the regulating voltage $V_{RR}$ and the exciting voltage $V_E$, and then determines the necessary phase angle $\theta_{E1}$ for transformer $102_1$ and phase angle $\theta_{E2}$ for transformer $102_2$ to meet the desired values of ratio $V_E/V_1$ and relative angle $\theta_E$.

Because the input signals $T_{PFC}$ and $\theta_{PFC}$ represent relative magnitude and angle of the voltages $V_1$ and $V_2$, respectively, a direct relationship exists between these signals and the phase angles of the individual rotary phase-shifting transformers.

Figure 6:
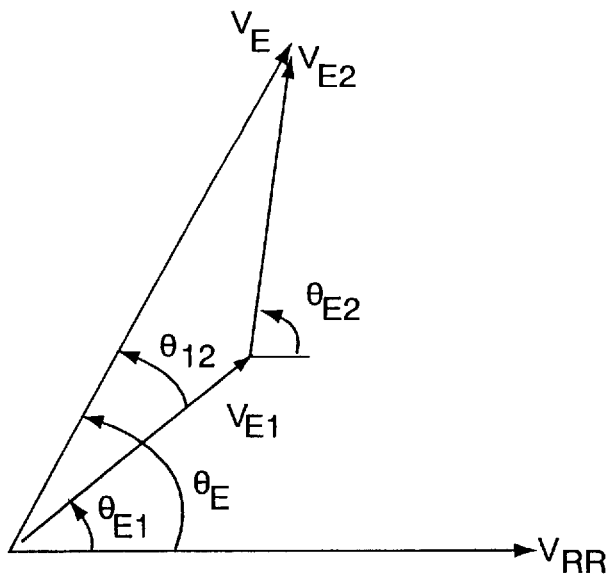
FIG. 6 is a phasor diagram for the two rotary transformers included in the rotary phase shifting network of FIG. 5.
Figure 7:
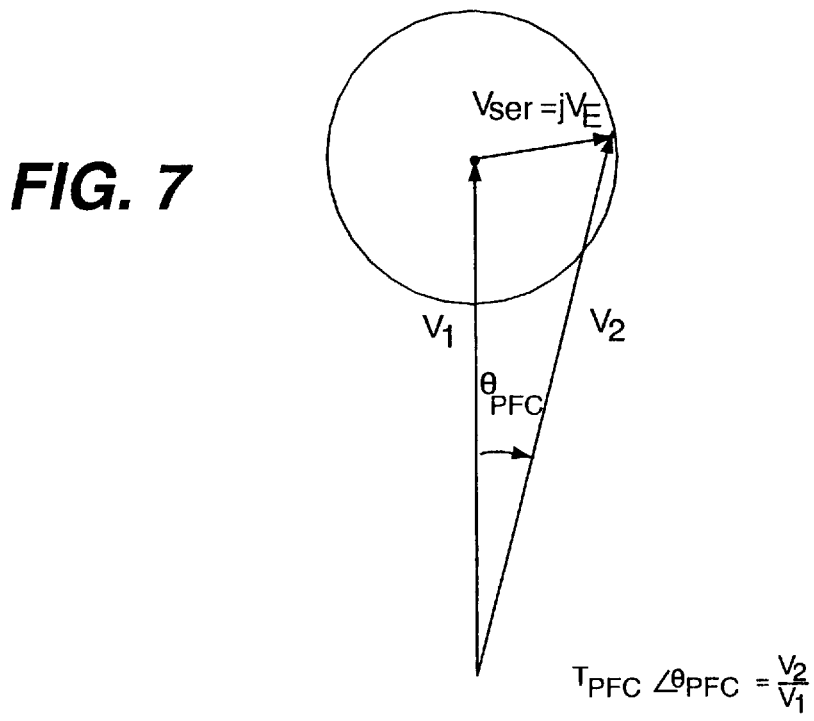
FIG. 7 is an overall phasor diagram for the power flow controller of the invention.

FIG. 6 and FIG. 7, together with the equations hereinafter discussed, explain e.g., how position controller 202 determines the phase angles $\theta_{E1}$ and $\theta_{E2}$ for transformers $102_1$ and $102_2$, respectively. FIG. 7 is an overall phasor diagram for power flow controller 20. The voltage $V_{ser}$ across power flow controller 20 is illustrated both in FIG. 1 and in FIG. 7. In FIG. 7 it is assumed that series transformer 40 has unity turns ratio and a 90° electrical rotation between $V_{ser}$ and $V_E$.

The signals $T_{PFC}$ and $\theta_{PFC}$ on lines 214 and 216 are defined in the following manner: $T_{PFC}$ is the magnitude of the ratio of $V_2/V_1$; $\theta_{PFC}$ is the phase angle by which $V_2$ leads $V_1$. These definitions and FIG. 7 are utilized to obtain Equation 1 and Equation 2:

$$V_{ser}/V_1 = (T_{PFC}\cos\theta_{PFC} - 1) + j(T_{PFC}\sin\theta_{PFC}) \quad \text{Eqn. 1}$$

$$V_E/V_1 = (T_{PFC}\sin\theta_{PFC}) + j(1 - T_{PFC}\cos\theta_{PFC}) \quad \text{Eqn. 2}$$

The above phasor between $V_E$ and $V_1$ (Eqn. 2) is readily converted to polar form yielding a magnitude and angle to form the signals ratio $V_E/V_1$ and relative angle $\theta_E$.

The relationship between the necessary values of phase angles $\theta_{E1}$ (the phase angle between stator and rotor of transformer $102_1$) and $\theta_{E2}$ (the phase angle between stator and rotor of transformer $102_2$) and the desired values of $V_E$ and $\theta_E$ is understood e.g., from FIG. 6. FIG. 6 is a phasor diagram for the two rotary transformers $102_1$ and $102_2$. In FIG. 6 (and also shown in FIG. 1), $V_{RR}$ is the voltage across regulating winding 62 of regulating transformer 42. Although the magnitudes of the voltages $V_{E1}$ and $V_{E2}$ are constant, by changing the phase angles $\theta_{E1}$ and $\theta_{E2}$, the magnitude of the resultant voltage vector $V_E$ as well as its phase $\theta_E$ can be selectively changed to meet the demands of the inputted order signals.

Regulating transformer 42 and the rotary phase shifting transformers 102 have non-unity turns ratios $T_{1R}$ and $T_{RE}$, respectively, in accordance with Equation 3 and Equation 4:

$$T_{1R} = V_{RR}/V_1 \quad \text{Eqn. 3}$$

$$T_{RE} = V_{E1}/V_{RR} = V_{E2}/V_{RR} \quad \text{Eqn. 4}$$

From FIG. 6, an angle $\theta_{12}$ between the individual phasors of the rotary phase shifting transformers 102 and the resultant is given by Equation 5:

$$\theta_{12} = \theta_E - E_{E1} = \mathrm{acos}[(V_E/V_1)/2\, T_{1R}T_{RE}] \quad \text{Eqn. 5}$$

Having computed angle $\theta_{12}$, the individual rotary phase shifting transformer angles $\theta_{E1}$ and $\theta_{E2}$ are then given by Equation 6 and Equation 7, respectively.

$$\theta_{E1} = \theta_E - \theta_{12} \quad \text{Eqn. 6}$$

$$\theta_{E2} = \theta_E + \theta_{12} \quad \text{Eqn. 7}$$

It is the values set for phase angles $\theta_{E1}$ and $\theta_{E2}$ that are applied to torque control amplifers 150 of transformers $102_1$ and $102_2$, respectively (see FIG. 2). In each transformer 102, torque control amplifier 150 outputs three phase signals TA, TB, and TC to torque control unit 106. As used herein and in this art, TA refers collectively to TA+ and TA–, TB refers collectively to TB+ and TB–, and so forth.

Thus, from the foregoing it is understood how control system 46 sets the values of phase angles $\theta_{E1}$ and $\theta_{E2}$ for transformers $102_1$ and $102_2$, respectively, in order to obtain the desired effective phase shift $\theta_{PFC}$ and voltage magnitude ratio $T_{PFC}$ between the first electrical area 24 and the second electrical area 26 in accordance with the operator input signals $P_O$ and $Q_O$.

Whereas the foregoing has assumed that the conversion of signals $T_{PFC}$ and $\theta_{PFC}$ to respective values $V_E$ and $\theta_E$ is performed in the illustrated embodiment by position controller 202, it should be understood that the conversion could alternatively be performed by high-level controller 200.

Moreover, high-level controller 200 may perform many different functions, depending upon the needs of the overall power system. A likely use is to regulate real and reactive power flow through the line which includes the power flow converter 20 described above.

The functions of controllers 200 and 202 of FIG. 2 can be performed in various ways and elements, e.g., by microprocessors. Further, it should be understood that one microprocessor or circuit can perform both the functions of controller 200 and 202, although in the foregoing the functions have been illustrated as being performed by two separate controllers.

Figure 1A:
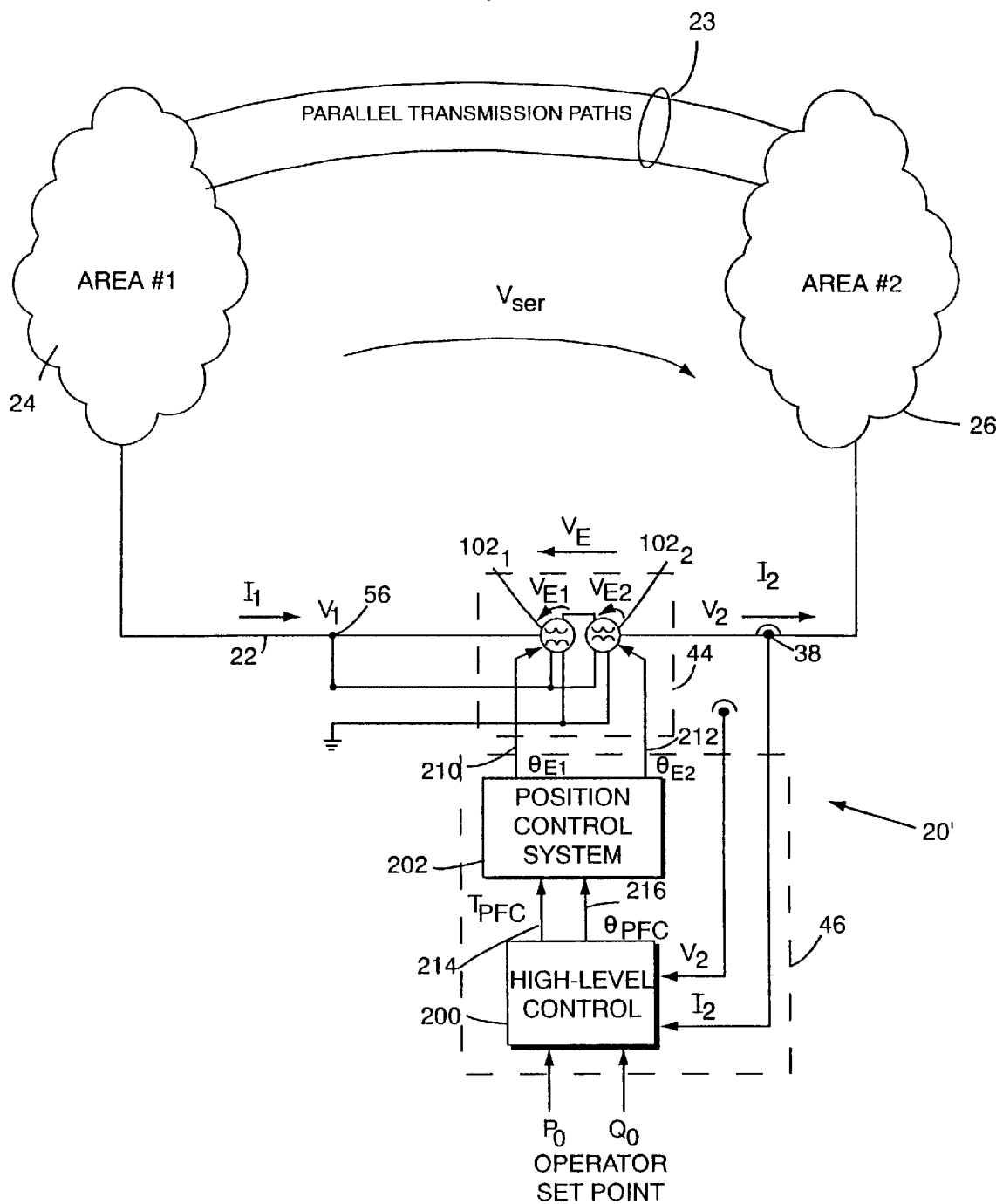
FIG. 1A is a schematic view of a power flow controller according to another embodiment of the invention.

FIG. 1A shows another embodiment of a power flow controller 20', also situated on transmission path or line 22 between first electrical area or network 24 and second electrical area or network 26. As in power flow controller 20 of FIG. 1, power flow controller 20' of FIG. 1A also has two rotary transformers $102_1$ and $102_2$. Power flow controller 20 has first terminals of the rotary transformers $102_1$ and $102_2$ connected in parallel and second terminals of rotary transformers $102_1$ and $102_2$ connected in series.

Unlike the embodiment of FIG. 1, the power flow controller 20' does not require series transformer 40 and regulating transformer 42. Rather, second terminals of second terminals of rotary transformers $102_1$ and $102_2$ connected in series along transmission path or line 22. First terminals of the rotary transformers $102_1$ and $102_2$ are connected in parallel to connection node 56, node 56 being on a first side of transmission path 22 and being at voltage magnitude $V_1$ of first electrical area 24. As mentioned previously, it should be understood that the first side of transmission path 22 can refer to a connection such as that shown for node 56, or connection to or internal to first electrical area 24 or second electrical area 26.

The structure and operation of control system 46 of power flow controller 20' is essentially identical to that aforedescribed with respect to power flow controller 20 of FIG. 1.

Examples of implementations of rotor drive section 106 are shown in U.S. patent application Ser. No. 08/550,941 filed Oct. 31, 1995 by Runkle et al. and entitled "INTERCONNECTION SYSTEM FOR ELECTRICAL SYSTEMS HAVING DIFFERING ELECTRICAL CHARACTERISTIC", which is incorporated herein by reference. For example, in some embodiments, rotor drive section 106 includes an actuator and some type of linkage (e.g., gearing) which interfaces with rotor assembly 110. For example, in one embodiment rotor drive section 106 comprises a worm gear drive arrangement. In other embodiments, rotor drive section 106 comprises an actuator such as a stepper motor acting through a radial (e.g, spur) gear, a direct drive arrangement, a hydraulic actuator turning a gear on rotor assembly 110, or a pneumatic actuator turning a gear on rotor assembly 110. In yet other embodiments, the function of the torque control unit is accomplished by providing two sets of windings on both the rotor and the stator, a first set of windings on the rotor and stator having a different number of poles (e.g., 2 poles) than a second set of windings on the rotor and stator (e.g., 4 or more poles). In view of the foregoing, it should be understood that any suitable drive mechanism may be employed for rotor drive section 106 so long as it is compatible with the closed loop angular position of rotor assembly 110 as described herein.

While the invention has been described in connection with what is presently considered to be the most practical and preferred embodiment, it is to be understood that the invention is not to be limited to the disclosed embodiment but, on the contrary, is intended to cover various modifications and equivalent arrangements included within the spirit and scope of the appended claims. For example, while the illustrated embodiment has shown connection to rotor subassembly 110 as being accomplished using collector rings 114, it should also be understood that other forms of connection, including flexible wiring, may instead be utilized.

What is claimed is:

1. A power flow controller connected on a transmission path between a first electrical area and a second electrical area, a first side of the transmission path being connected to the first electrical area, the apparatus comprising:

a first rotary phase shifting transformer having a first rotary phase shifting transformer first terminal and a first rotary phase shifting transformer second terminal;

a second rotary phase shifting transformer having a second rotary phase shifting transformer first terminal and a second rotary phase shifting transformer second terminal;

wherein the first rotary phase shifting transformer first terminal and the second rotary phase shifting transformer first terminal are connected in parallel to the first side of the transmission path and the first rotary phase shifting transformer second terminal and the second rotary phase shifting transformer second terminal are connected in series with the transmission path; and a control system for applying control signals to the first rotary phase shifting transformer and the second rotary phase shifting transformer whereby an effective phase shift and a voltage magnitude ratio are provided between the first electrical area and the second electrical area.

2. The apparatus of claim 1, wherein the control system applies the control signals to provide independently an effective phase shift and a voltage magnitude ratio between the first electrical area and the second electrical area.

3. The apparatus of claim 1, further comprising:

a series transformer having a series winding connected on the transmission path between the first electrical area and the second electrical area and an excited winding;

a regulating transformer having an exciting winding connected to the series transformer and a regulating winding; and wherein the regulating winding of the regulation transformer is connected in parallel to the first rotary phase shifting transformer first terminal and the second rotary phase shifting transformer first terminal; and wherein the first rotary phase shifting transformer second terminal and the second rotary phase shifting transformer second terminal are connected in series with the excited winding of the series transformer.

4. The apparatus of claim 1 wherein each of the first rotary phase shifting transformer and the second rotary phase shifting transformer has a rotor and a stator, a voltage phasor of the rotor and stator of the first rotary phase shifting transformer being offset by a phase angle $\theta_{E1}$ related to an angular position of the rotor of the first rotary phase shifting transformer, a voltage phasor of the rotor and stator of the second rotary phase shifting transformer being offset by a phase angle $\theta_{E2}$ related to an angular position of the rotor of the second rotary phase shifting transformer, and wherein desired values of phase angle $\theta_{E1}$ and phase angle $\theta_{E2}$ are respectively applied by the control system to the first rotary phase shifting transformer and the second rotary phase shifting transformer.

5. The apparatus of claim 4, wherein:
the control system comprises a position controller and a high level controller;
wherein the high level controller applies a signal indicative of a desired effective phase shift and a signal indicative of a voltage magnitude ratio to the position controller, the high level controller receiving at least the following input signals: an input signal related to a voltage magnitude $V_2$ of the second area, and an input signal related to current $I_2$ flowing between the second electrical area and the power flow controller;
wherein the position controller uses the signal indicative of a desired effective phase shift and the signal indicative of a voltage magnitude ratio to generate the desired values of phase angle $\theta_{E1}$ and phase angle $\theta_{E2}$.

6. The apparatus of claim 4, wherein an effective net voltage $V_E$ is generated across a series connection of the first rotary phase shifting transformer and the second rotary phase shifting transformer in accordance with a phasor diagram of FIG. 6, wherein a voltage $V_{RR}$ is applied in parallel to the first terminal of the first rotary phase shifting transformer and the first terminal of the second rotary phase shifting transformer, and wherein a phase angle $\theta_E$ is generated by the series connection of the second terminal of the first rotary phase shifting transformer and the second terminal of the second rotary phase shifting transformer.

7. The apparatus of claim 6, wherein a voltage $V_{ser}$ is injected by the power flow controller between the first electrical area and the second electrical area is depicted by a phasor diagram of FIG. 7, and wherein $\theta_{PFC}$ is the effective phase shift and $T_{PFC}$ is a ratio of voltage magnitudes of the first electrical area and the second electrical area.

8. A method of regulating power flow on a transmission path between a first electrical area having a voltage magnitude $V_1$ and a second electrical area having a voltage magnitude $V_2$, the transmission path having a series winding of a series transformer, a regulating transformer having an exciting winding connected to the series transformer and a regulating winding; the method comprising:
connecting the regulation winding of the regulation transformer output signal to a first terminal of a rotary phase shifting transformer network comprising at least two rotary phase shifting transformers, a second terminal of the rotary phase shifting transformer network being connected in series with an excited winding of the series transformer; and
applying a position control signal to the rotary phase shifting transformer network whereby an effective net voltage $V_E$ generated across the rotary phase shifting transformer network causes an effective phase shift and a voltage magnitude ratio to be provided between the first electrical area and the second electrical area.

9. The method of claim 8, wherein the position control signal is applied to obtain independently the effective phase shift and the voltage magnitude ratio between the first electrical area and the second electrical area.

10. The method of claim 8, wherein the step of connecting the regulation winding of the regulation transformer to the first terminal of the rotary phase shifting transformer network includes connecting the regulation winding of the regulation transformer in parallel to first terminals of at least two rotary phase shifting transformers, a second terminal of the first rotary phase shifting transformer and a second terminal of the second rotary phase shifting transformer being connected in series with excited winding of the series transformer.

11. The method of claim 10, wherein each of the first rotary phase shifting transformer and the second rotary phase shifting transformer has a rotor and a stator, a voltage phasor of the rotor and stator of the first rotary phase shifting transformer being offset by a phase angle $\theta_{E1}$ related to an angular position of the rotor of the first rotary phase shifting transformer, a voltage phasor of the rotor and stator of the second rotary phase shifting transformer being offset by a phase angle $\theta_{E2}$ related to an angular position of the rotor of the second rotary phase shifting transformer, and wherein the method further comprises:
applying control signals indicative of desired values of phase angle $\theta_{E1}$ and phase angle $\theta_{E2}$ to the first rotary phase shifting transformer and the second rotary phase shifting transformer respectively for providing the effective phase shift and the voltage magnitude ratio between the first electrical area and the second electrical area.

12. The method of claim 11, further comprising:
using a high level controller to apply a signal indicative of a desired a effective phase shift and a signal indicative of a voltage magnitude ratio to a position controller, the high level controller receiving the following input signals: an input signal related to the voltage magnitude $V_2$, and an input signal related to current $I_2$ flowing between the second electrical area and the power flow controller;
using the position controller to generate the desired values of phase angle $\theta_{E1}$ and phase angle $\theta_{E2}$.

13. The method of claim 11, further comprising generating an effective net voltage $V_E$ across a series connection of the first rotary phase shifting transformer and the second rotary phase shifting transformer in accordance with a phasor diagram of FIG. 6, a voltage $V_{RR}$ is applied in parallel to the first terminal of the first rotary phase shifting transformer and the first terminal of the second rotary phase shifting transformer, and wherein a phase angle $\theta_E$ is generated by the series connection of the second terminal of the first rotary phase shifting transformer and the second terminal of the second rotary phase shifting transformer.

14. The method of claim 13, further comprising injecting a voltage $V_{ser}$ by the power flow controller between the first electrical area and the second electrical area, the voltage $V_{ser}$ being depicted by a phasor diagram of FIG. 7, and wherein $\theta_{PFC}$ is the effective phase shift and $T_{PFC}$ is a ratio of voltage magnitudes of the first electrical area and the second electrical area.

15. A method of regulating power flow on a transmission path between a first electrical area and a second electrical area, a first side of the transmission path being connected to the first electrical area, the method comprising:
connecting a first terminal of a first rotary phase shifting transformer and the first terminal of a second rotary phase shifting transformer first terminal in parallel to the first side of the transmission path;
connecting a second terminal of the first rotary phase shifting transformer and a second terminal of the second rotary phase shifting transformer second terminal in series with the transmission path; and
applying a first position control signal to the first rotary phase shifting transformer and a second position control signal to the second rotary phase shifting transformer whereby an effective net voltage $V_E$ generated across the rotary phase shifting transformer network causes an effective phase shift and a voltage magnitude ratio to be provided between the first electrical area and the second electrical area.

16. The method of claim 15, wherein the position control signal is applied to obtain independently the effective phase shift and the voltage magnitude ratio between the first electrical area and the second electrical area.

17. The method of claim 15, wherein each of the first rotary phase shifting transformer and the second rotary phase shifting transformer has a rotor and a stator, a voltage phasor of the rotor and stator of the first rotary phase shifting transformer being offset by a phase angle $\theta_{E1}$ related to an angular position of the rotor of the first rotary phase shifting transformer, a voltage phasor of the rotor and stator of the second rotary phase shifting transformer being offset by a phase angle $\theta_{E2}$ related to an angular position of the rotor of the second rotary phase shifting transformer, and wherein the method further comprises:

applying control signals indicative of desired values of phase angle $\theta_{E1}$ and phase angle $\theta_{E2}$ to the first rotary phase shifting transformer and the second rotary phase shifting transformer respectively for providing the effective phase shift and the voltage magnitude ratio between the first electrical area and the second electrical area.

18. The method of claim 17, further comprising:

using a high level controller to apply a signal indicative of a desired effective phase shift and a signal indicative of a desired voltage magnitude ratio to a position controller, the high level controller receiving the following input signals: an input signal related to the voltage magnitude $V_2$, and an input signal related to current $I_2$ flowing between the second electrical area and the power flow controller;

using the position controller to generate the desired values of phase angle $\theta_{E1}$ and phase angle $\theta_{E2}$.

\* \* \* \* \*